Patented May 12, 1953

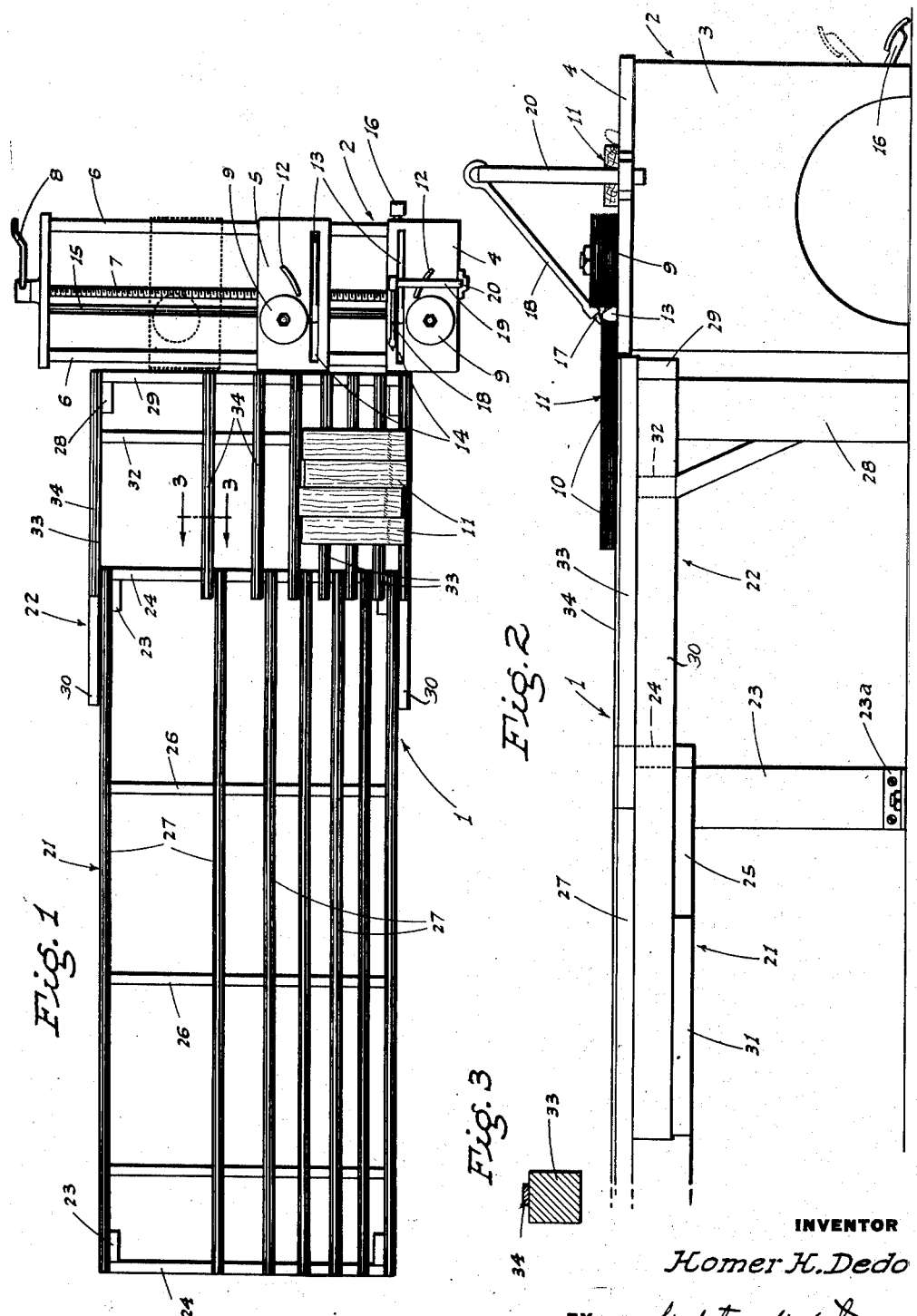

2,638,135

UNITED STATES PATENT OFFICE 2,638,135

LUMBER RECEIVING TABLE FOR DOUBLE-ENDED TENONER

Homer H. Dedo, Merced, Calif.

Application June 12, 1951, Serial No. 231,240

2 Claims. (Cl. 143—132)

1

This invention provides, as a major object, a novel table for the reception, and support in side by side relation, of lengths of lumber discharged from a milling machine; the table being especially designed—but not limited—for use with a double-ended tenoner employed to simultaneously cut multiple mortise and tenons on opposite ends of lengths of lumber.

Another object of the invention is to provide a lumber receiving table which is particularly useful in connection with the handling of relatively short lengths of lumber of varying longitudinal dimensions, as, for example, in the Method of Producing Lengths of Lumber by Fingerjointing, Serial No. 223,618, filed April 28, 1951.

A further object of the invention is to provide a lumber receiving table, adapted to be mounted beyond a milling machine, which includes a fixed table section and a slidable table section; the latter normally being immediately adjacent the machine but manually slidable at will to a retracted position clear of said machine so as to afford ready and convenient access to the same for servicing, adjustment, or repair.

An additional object of the invention is to provide a lumber receiving table which includes a novel assembly of transversely spaced, longitudinally extending rails on which the lengths of lumber are supported; said lengths being movable from the slidable table sections to the fixed table section without obstruction.

It is also an object of the invention to provide a lumber receiving table which is designed for ease and economy of manufacture.

Still another object of the invention is to provide a practical and reliable lumber receiving table, and one which will be exceedingly effective for the purpose for which it is designed.

These objects are accomplished by means of such structure and relative arrangement of parts as will fully appear by a perusal of the following specification and claims.

In the drawings:

Fig. 1 is a plan view of the lumber receiving table as in use.

Fig. 2 is an enlarged fragmentary side elevation of the same.

Fig. 3 is a fragmentary cross section on line 3—3 of Fig. 1.

Referring now more particularly to the characters of reference on the drawings, the table is indicated generally at 1, being an elongated structure extending lengthwise beyond the discharge end of a double-ended tenoner, indicated generally at 2.

The double-ended tenoner 2 is a substantially conventional lumber milling machine and includes a base housing 3 having a fixed platform 4 and a laterally adjustable platform 5 thereon; the latter platform being carried on ways 6, and

2 adjusted—with respect to the fixed platform 4—by means of a screw 7 actuated at one end by a hand lever 8.

Each of the platforms 4 and 5 carries an upstanding or vertical axis, rotary cutter 9, each driven from below the platform by an electric motor (not shown); the cutters 9 being designed to simultaneously mill multiple mortise and tenons, as at 10, on opposite ends of lengths of lumber 11 advanced one at a time on the platforms 4 and 5 between said cutters. Each length of lumber 11 is guided into the cutters 9 by guides 12 on said platforms; each length being advanced by lumber advancing or swing arms 13 which project upwardly through longitudinal slots 14 in the platforms 4 and 5. Such swing arms are carried on a cross shaft 15 which is in turn actuated by a foot pedal 16. When the foot pedal is raised, as in dotted lines in Fig. 2, the lumber advancing arms 13 are retracted, as also shown in dotted lines in said figure.

Upon depression of the foot pedal 16 from its dotted line to its full line position, as in Fig. 2, the lumber advancing arms 13 project the engaged length of lumber 11 between the rotary cutters 9 and advance such length to a discharge position, as shown in full lines in said figure. As the end-milled lengths of lumber reach the discharge end of the platforms 4 and 5 they transfer to the immediately adjacent end of the table 1, whose structure is hereinafter described in detail. As the lengths of lumber 11 leave the double-ended tenoner 2 and pass onto the table 1, such lengths are automatically marked on top by a marking crayon carried on the lower end of a forwardly and downwardly inclined swing arm 18; the latter being pivotally attached, at its upper end, to a laterally inwardly projecting extension 19 on an upstanding post 20 mounted at one end of the double-ended tenoner 2.

The purpose of such marking of the lengths of lumber 11 is not only to identify the same for longitudinal dimension, but to facilitate the maintenance of such lengths in proper order for subsequent handling in a process such as that shown in the above identified copending application.

The elongated table 1 onto which the lengths of lumber 11 transfer from the double-ended tenoner 2 is of exactly the same height as the latter, and such table comprises a fixed table section 21 disposed in spaced relation to the double-ended tenoner 2 and a slidable table section 22 which normally occupies the space between said fixed table section 21 and tenoner 2.

The fixed table section 21 comprises corner legs 23 having lower end flanges 23a secured to the floor; such corner legs being connected, at their upper end portions, by transverse ends 24 and longitudinal side beams 25.

Additionally, the fixed table section 21 includes intermediate cross bars 26 which are secured to and span between the longitudinal side beams 25.

The top of the fixed table section 21 is of skeleton construction and comprises a plurality of longitudinal rails 27 spaced apart transversely with the spacing progressively increasing from one side to the other of said fixed table 21.

The slidable table section 22 comprises outer corner legs 28, an outer transverse end 29, and elongated side beams 30; such side beams 30 being of a length, and spaced apart a distance, such that they extend in face to face engagement with the longitudinal side beams 25 of the fixed table section 21. The elongated side beams 30 are slidable relative to the longitudinal side beams 25, and the former are supported from said beams 25 by supporting blocks or rails 31 affixed to the latter and engaging said beams 30 from below.

With this arrangement the slidable table section 22 is movable from an extended position in abutment with the adjacent end of the double-ended tenoner 2, to a retracted position with substantial space between said tenoner and the outer end of said slidable table section 22. The advantage of this arrangement is that it permits the operator to gain access to the discharge end of the double-ended tenoner at such times as may be necessary for servicing, adjustment, or repair.

By reason of the described structure, the slidable table section 22 is readily manually adjustable between its respective positions.

The slidable table section 22 includes an intermediate cross bar 32 secured to, and spanning between, the elongated side beams 30 but relatively close to the outer transverse end 29; there being a plurality of longitudinal, transversely spaced rails 33 which form the top of the slidable table section 22. The longitudinal rails 33 correspond to and lap the longitudinal rails 27 of the fixed table section 21, being secured to the outer transverse end 29 and intermediate cross bar 32, but slidably resting on the adjacent transverse end 24 of the fixed table section.

The longitudinal rails 33 have substantially the same progressive tranverse spacing as the longitudinal rails 27, but are offset laterally to the extent necessary to permit of the lapping of corresponding rails, as shown.

When the slidable table section 22 is retracted, the longitudinal rails 33 slide on the adjacent transverse end 24 and run into the fixed table section 21 alongside the corresponding longitudinal rails 27. The rails 27 and 33 are each fitted, on top and for the full length, with a relatively narrow skid strip 34 which minimizes the friction drag of the lengths 11 of lumber as they slide on the table.

From the table the lengths 11 of lumber are manually removed and stacked on a carry-off truck or delivered to a carry-off conveyor, neither being shown.

From the foregoing description it will be readily seen that there has been produced such a lumber receiving table as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. A table adapted to receive lumber from a milling machine, said table being elongated, projecting from immediately adjacent the discharge end of said machine, and comprising a fixed table section spaced from the machine, and a longitudinally slidable section normally occupying the space between said fixed table section and the machine; and the slidable table section being retractible in the direction of and part into the fixed table section; the fixed table section including longitudinal work-supporting rails, and the slidable table section including outer corner legs, and longitudinal side rails extending alongside corresponding side rails of the fixed table section; and means on the fixed table section slidably supporting the rails of the slidable table section.

2. A table adapted to receive transversely extending variable length lumber from a milling machine, said table being elongated, projecting from immediately adjacent the discharge end of said machine, and comprising a fixed table section spaced from the machine, and a longitudinally slidable table section normally occupying the space between said fixed table section and the machine; the fixed table section including corner legs, transverse ends connecting the legs adjacent the top, longitudinal side beams connecting the legs adjacent the top, and a plurality of transversely spaced longitudinal rails extending full length of said fixed table section and supported by said ends; the slidable section including outer corner legs, a transverse end connecting said outer legs adjacent the top, longitudinal side beams secured to the outer corner legs adjacent the top and extending therefrom to positions in slidable relation alongside the corresponding longitudinal side beams of the fixed table section; means on the latter supporting the longitudinal side beams of the slidable table section, and each table section including a plurality of longitudinally extending transversely spaced lumber supporting rails fixed on top thereof, and corresponding rails of the separate table sections lapping at adjacent ends.

HOMER H. DEDO.

References Cited in the file of this patent

UNITED STATES PATENTS

| Number | Name | Date |
| --- | --- | --- |
| 26,119 | Palmer | Nov. 15, 1859 |
| 282,436 | Bowser | July 31, 1883 |
| 775,477 | Norlin | Nov. 22, 1904 |
| 949,119 | Gruender | Feb. 15, 1910 |
| 1,073,128 | Hofmayr | Sept. 16, 1913 |
| 1,267,779 | Lichtenstein | May 28, 1918 |
| 1,511,141 | Scott et al. | Oct. 7, 1924 |
| 1,514,764 | Heinzerling | Nov. 11, 1924 |
| 1,803,857 | Lumb | May 5, 1931 |
| 1,853,009 | Walter | Apr. 5, 1932 |
| 1,938,548 | Tautz | Dec. 5, 1933 |
| 2,207,782 | Carlson | July 16, 1940 |
| 2,342,471 | Jampol | Feb. 22, 1944 |

FOREIGN PATENTS

| Number | Country | Date |
| --- | --- | --- |
| 7,016 | Australia | Apr. 26, 1927 |